March 23, 1937.    C. C. FARMER ET AL    2,074,743
FLUID PRESSURE BRAKE
Filed Aug. 5, 1936    2 Sheets-Sheet 2

Fig. 2.

INVENTOR
CLYDE C. FARMER
ELLIS E. HEWITT
BY
Wm. M. Cady
ATTORNEY

Patented Mar. 23, 1937

2,074,743

UNITED STATES PATENT OFFICE 2,074,743

FLUID PRESSURE BRAKE

Clyde C. Farmer, Pittsburgh, and Ellis E. Hewitt, Edgewood, Pa., assignors to The Westinghouse Air Brake Company, Wilmerding, Pa., a corporation of Pennsylvania Application August 5, 1936, Serial No. 94,372

38 Claims. (Cl. 303—23)

This invention relates to fluid pressure brake equipment which is adapted to be changed over or conditioned to meet the braking requirements of one or another of a plurality of classes of railway train service, such, for instance, as passenger, express and freight train service, and relates more particularly to that type of equipment disclosed in our pending joint application, Serial No. 743,546, filed September 11, 1934.

The principal object of the present invention is to provide an improved fluid pressure brake equipment of the above mentioned type.

To meet the braking requirements of the several classes of railway transportation service above enumerated, the fluid pressure brake equipment disclosed in our aforementioned pending application is adapted to be changed over or conditioned for different classes of train service by means of the manually operative change-over device shown in the drawings of said application, or by means of either the automatically operative change-over valve device proposed by us and made the subject of our pending joint application, Serial No. 747,734, filed October 10, 1934, or the automatically operative change-over valve device disclosed in the patent of Clyde C. Farmer, No. 2,035,056.

Another object of the present invention is to provide an improved automatically operative change-over valve mechanism for the above mentioned type of fluid pressure brake equipment.

Another object of the invention is to provide an improved valve mechanism for controlling the supply of fluid under pressure to and the release of fluid under pressure from both the take-up cylinder device and the brake cylinder of a fluid pressure brake equipment of the above mentioned type.

A further object of the invention is to provide a fluid pressure brake equipment of the aforementioned type with improved means for regulating the rate of flow of fluid in effecting an emergency application of the brakes in each of a plurality of classes of train service. According to this object said means will provide for a rapid build up of brake cylinder pressure in passenger train service, a rapid inshot of fluid under pressure to the brake cylinder followed by a slower build up in express train service, and a rapid inshot of fluid to the brake cylinder followed by a slow build up of brake cylinder pressure and finally a rapid inshot of fluid under pressure to the brake cylinder in freight train service.

In the accompanying drawings.

Figure 1:
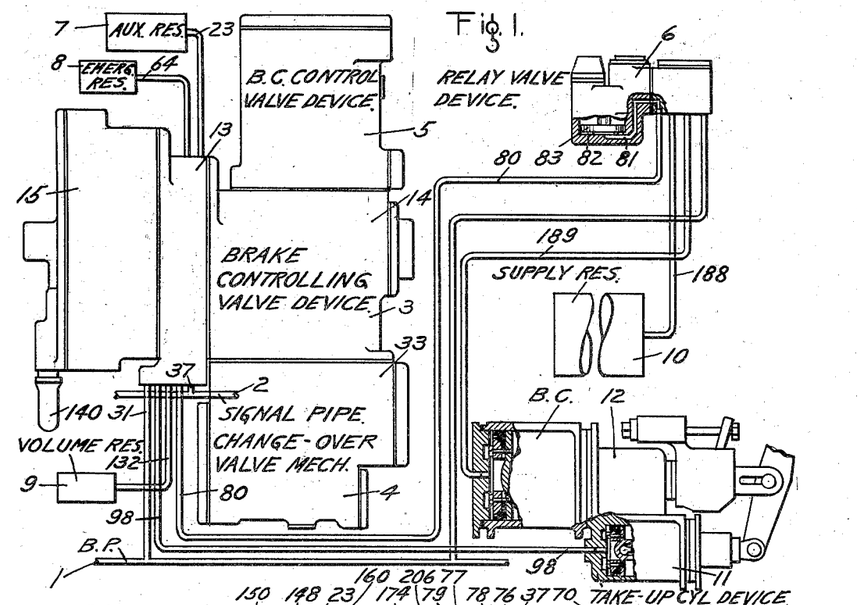
Fig. 1 is a diagrammatic view of a fluid pressure brake equipment embodying the invention.

As shown in the drawings, the equipment may comprise a brake pipe 1, a signal pipe 2, a brake controlling valve device 3, a change-over valve mechanism 4, a brake cylinder control valve mechanism 5, a relay valve device 6, an auxiliary reservoir 7, an emergency reservoir 8, a volume reservoir 9, a supply reservoir 10, a take-up cylinder device 11 and a brake cylinder 12.

The brake controlling valve device 3, with but several exceptions, which will hereinafter fully appear, may be of substantially the same construction as the controlling valve device fully disclosed and claimed in our aforementioned pending application, Serial No. 743,546 and may have substantially the same operating characteristics. In view of this, the details of construction and the operating characteristics of the equipment which correspond substantially with those of the equipment disclosed in this last mentioned pending application, have for the most part been omitted from the present application, thus simplifying the showing and description of the invention.

As shown, the brake controlling valve device may comprise a pipe bracket 13 to one side of which is clamped the casing of an equalizing valve device 14 and to the opposite side of which is clamped the casing of an emergency valve device 15.

The casing of the equalizing valve device has formed therein a piston chamber 16 containing a piston 17 having a stem 18 adapted to operate a main slide valve 19 and an auxiliary slide valve 20 contained in a valve chamber 21 which is connected to the auxiliary reservoir 7 through a passage 22 and a passage and pipe 23.

The casing of the emergency valve device has formed therein a piston chamber 24 containing a piston 25 having a stem 26 adapted to operate a main slide valve 27 and the usual auxiliary slide valve (not shown) contained in a chamber 28 which is connected by way of a passage 29 to a quick action chamber 30 which is formed in the pipe bracket 13.

The brake pipe 1 is in communication with both the equalizing piston chamber 16 and the emergency piston chamber 24 by way of a branch pipe and passage 31 and a passage 32.

The change-over valve mechanism 4 comprises a casing 33 which, in the present embodiment of the invention, is secured to the casing of the equalizing valve device and also comprises a change-over valve device and a control valve device for controlling the operation of the change-over valve device.

The control valve device just referred to comprises spaced movable abutments which, in the present embodiment of the invention, are in the form of flexible diaphragms 34 and 35, the diaphragm 34 having a greater face area than the diaphragm 35. At the outer or face side of the diaphragm 34 there is a chamber 36 which is constantly in communication, through a passage and pipe 37, with the signal pipe 2. Leading from the passage 37 to the face of a slide valve seat 38 of the casing 33 is a branch passage 39. At the outer or face side of the diaphragm 35 there is a chamber 40 which is connected to a passage 41 which leads to the face of the slide valve seat 38.

Between the diaphragms 34 and 35 there is a chamber 42 which is in constant communication with the atmosphere by way of a passage 43. Contained in this chamber 42 is a longitudinally movable stem 44 which is operatively engaged at one end by the diaphragm 34 and which is adapted to operate a slide valve 45 also contained in the chamber and slidably engaging the slide valve seat 38, said slide valve being maintained in close engagement with the seat by means of a spring weighted rockable strut 46 interposed between and operatively engaging the casing and the back of the slide valve.

There is also contained in the chamber 42 a mechanism which, as will hereinafter more fully appear, is subject to the action of the diaphragm 34 to control the operation of the stem 44 and consequently the slide valve 45, said mechanism comprising a combined spring seat and stop member 47 which is preferably arranged in longitudinal alignment with the stem 44 and which, at its left hand end, is in operative engagement with the diaphragm 35, said member being movable in the direction of its length and having a guide collar 48 which is slidably guided in a bushing 49 secured to the casing. This member 47 also has a stem 50 on which there is slidably mounted a movable stop 51 which is adapted to be engaged by an annular spring seat 52 interposed between the stop 51 and stem 44 and slidably guided by the casing.

Interposed between and operatively engaging the guide collar 48 and the movable stop 51 is a coil spring 53 and interposed between and operatively engaging the spring seat 52 and a spring seat 54 contained in the chamber 42 and abutting the inner end of the bushing 49 is a coil spring 55 which surrounds the spring 53. Movement of the spring seat 52 toward the right by the action of the spring 55 is adapted to be limited by an annular stop shoulder 56 which may be integral with the casing and which extends into the path of travel of the spring seat. Movement of the stop 51 toward the right by the action of the spring 53 is limited by means of an annular collar or snap ring 57 which is secured to the stem 50.

The change-over valve device comprises spaced pistons 58, 59 which are rigidly connected together by means of a piston stem 60 which is adapted to shift a slide valve 61 to one or another of two change-over or conditioning positions, said valve being contained in a chamber 62 located between the pistons and constantly connected to the emergency reservoir 8 through a passage 63 and a passage and pipe 64. This valve chamber is constantly connnected to a control passage 65 leading to the face of the slide valve seat 38 of the control valve device.

At the face side of the piston 58 there is a chamber 66 which is connected to a control passage 67 leading to the control slide valve seat 38, and at the face side of the piston 59 there is a chamber 68 which is connected to a control passage 69 leading to said slide valve seat 38.

Contained in a chamber 70 in the casing of the change-over valve mechanism 4 is a brake cylinder build up control valve 71 which is adapted to be operated by a flexible diaphragm 72. At the right hand or face side of the diaphragm there is a chamber 73 which is connected to a passage 74 leading to the face of the control slide valve seat 38. The valve 71 is adapted to seat on an annular seat rib 75 formed on the casing and when so seated, the portion of the face of the valve which is within the seat rib is connected through a passage 76 to a passage 77 leading to the seat for the change-over slide valve and to the brake cylinder control valve mechanism 5 as will hereinafter more fully appear. The portion of the face of the valve which is on the outside of the valve is connected through a restricted passage 78 to a passage 79 leading to a pipe 80 which is connected through a passage 81 to the piston chamber 82 on the face side of the piston 83 of the relay valve device 6.

The relay valve device 6 is provided for the purpose of controlling the supply of fluid under pressure from the supply reservoir 10 to the brake cylinder 12 and the release of fluid under pressure from the brake cylinder and is further for the purpose of controlling the charging of the supply reservoir with fluid under pressure from the brake pipe. This relay valve device may be identical with the corresponding device fully shown and described in our aforementioned pending application, Serial 743,546 and in view of this a detailed description here of the device is deemed unnecessary.

The brake cylinder control valve mechanism 5 is provided for the purpose of cutting the relay valve device 6 into action when the pressure of fluid in the take-up brake cylinder has been increased a predetermined amount as will hereinafter fully appear, and may comprise a control valve device and a pilot valve device. The control valve device may comprise a piston 84 which is contained in a chamber 85 and which is subject to the pressure of a coil spring 86 contained in this chamber. The piston 84 is provided with a stem 87 which is adapted to operate a slide valve 88 contained in a chamber 89 which is connected through a passage 90 to the auxiliary reservoir passage 23.

Figure 2:
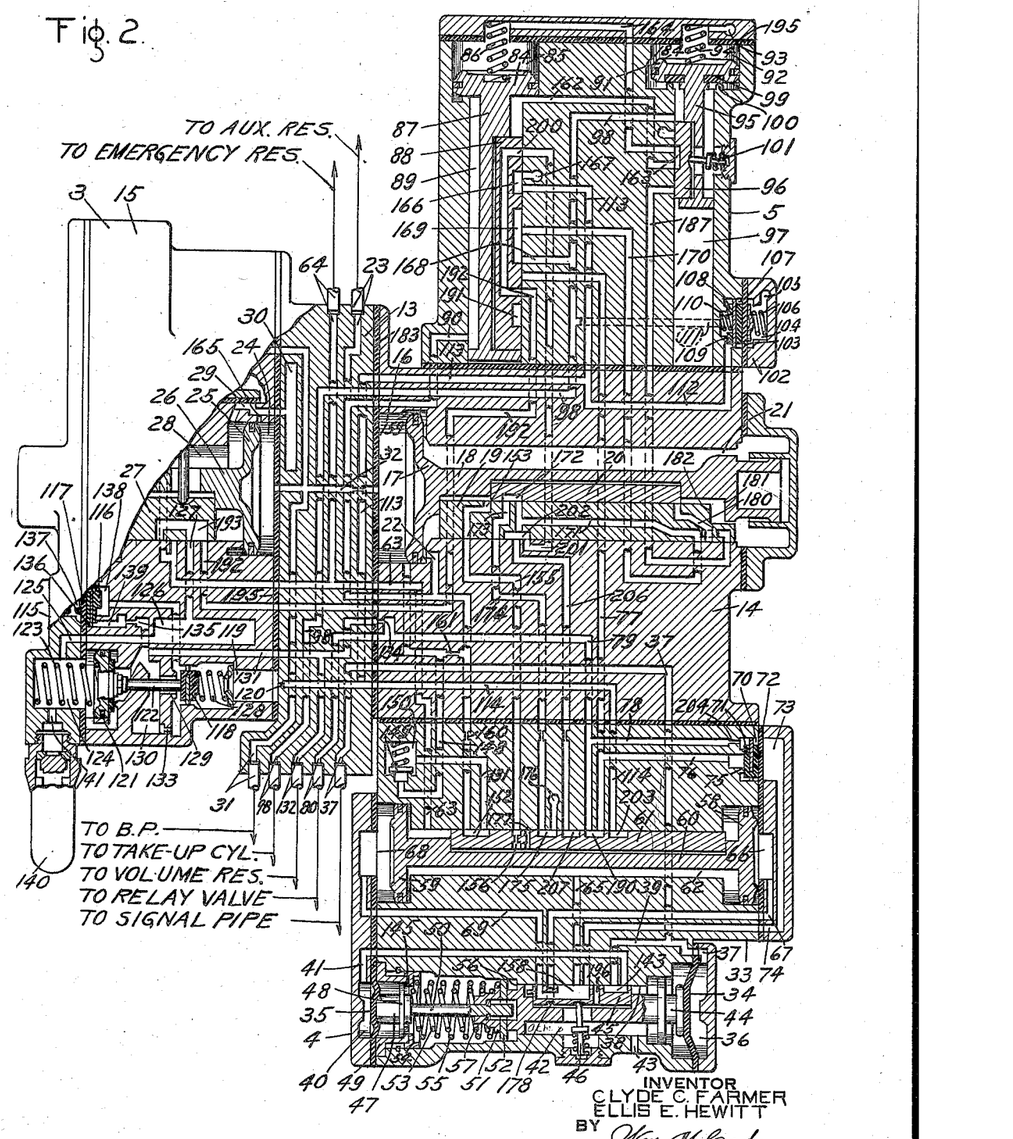
Fig. 2 is an enlarged diagrammatic sectional view of a portion of the equipment, the change-over valve mechanism being shown in position for conditioning the equipment for passenger train service.

The pilot valve device of the brake cylinder control valve mechanism 5 may comprise a piston 91 which is contained in a chamber 92 connected to a passage 93 leading to the atmosphere. This piston 91 is subject to the pressure of a coil spring 94 contained in chamber 92 and is provided with a stem 95 which is adapted to operate a slide valve 96 contained in a chamber 97, which chamber, with the slide valve 96 in its normal release position as shown in Fig. 2, is connected to the take-up cylinder 11 through a passage and pipe 98. Mounted on the back of the piston 91 is a gasket 99 which is adapted to seat on an annular seat rib 100. The pilot slide valve 96 is at all times urged into close contact with its seat by means of a spring weighted rockable strut 101.

Mounted in the casing of the brake cylinder control valve mechanism 5 is a combined maintaining and release control valve device 102 which, as will hereinafter more fully appear, is provided for the purpose of maintaining take-up cylinder pressure against leakage when an application of the brakes is effected and of controlling the release of fluid under pressure from the take-up cylinder in releasing the brakes. This valve device may comprise a flexible diaphragm 103 having at one side a chamber 104 open through a passage 105 to the atmosphere and containing a spring 106 which is interposed between and operatively engages the casing and one side of the diaphragm, at the other side of the diaphragm there is a chamber 107 which contains a valve 108 adapted to engage an annular seat rib 109 formed on the casing. Normally the valve is held seated by the spring 106 acting through the medium of the diaphragm against the opposing pressure of a coil spring 110 of lesser value contained in the chamber 107. With the valve seated, the inner seated area of the valve is connected through a passage 111 to passage 98, and the outer seated area is connected through a passage 112 to a passage 113 which leads from a brake cylinder passage 114 to the seat for the slide valve 86 of the brake cylinder control valve mechanism 5.

Associated with the emergency valve device and mounted in the casing thereof is an inshot or relay piston chamber pressure build-up control valve mechanism 115 which, as will hereinafter more fully appear, is operative in effecting an emergency application of the brakes, only when the equipment is changed over or conditioned for freight train operation, to effect the operation of the relay valve device to provide an initial inshot of fluid to the brake cylinder until a predetermined brake cylinder pressure (about fifteen pounds) is developed and to then restrict the rate of flow of fluid to the brake cylinder 12, in other words, the mechanism 115 functions to pilot the action of the relay valve device 6 in effecting an emergency application of the brakes until such time as a timing valve 116 which is controlled through the medium of a flexible diaphragm 117 operates, as will hereinafter more fully appear, to provide a final inshot of fluid to effect the operation of the relay valve device to provide a final inshot of fluid to the brake cylinder.

This valve mechanism 115 is similar in construction to the inshot valve mechanism fully described in our aforementioned pending application, Serial No. 743,546, and briefly described, may comprise a valve 118 which is contained in a chamber 119 connected to the passage 114, there being a restriction 120 interposed in the passage at a point adjacent the chamber 119. The mechanism also comprises a valve piston 121 having a stem 122 through the medium of which the operation of the valve 118 is controlled. Normally the valve piston 121 is maintained in sealing engagement with the casing by the action of a spring 123 contained in a piston chamber 124 which is connected through a passage 125 and a small volume reservoir 126 to a passage 127 leading to the seat for the emergency main slide valve 27, and when in this position the stem 122 maintains the valve 118 unseated against the action of a spring 128 tending to seat the valve.

With the valve 118 unseated, the valve chamber 119 is open to the volume reservoir 9 by way of a passage 129, a chamber 130, a passage 131 and a passage and pipe 132.

The valve chamber 119 is also connected to the chamber 130 by a restricted passage 133. The passage 131 is connected through a choke 134 to the passage 79 so that the chamber 119 is in communication with the piston chamber 82 of the relay valve device 6.

The chamber 130 of the valve mechanism 115 is also connected through a restricted passage 135 to a valve chamber 136 at one side of the flexible diaphragm 117 and containing the valve 116. At the other side of the diaphragm there is a chamber 137 which, although not shown, is connected in the usual manner to the emergency valve chamber 28. The inner seated area of the valve 116 is exposed to a chamber 138 which is connected through a passage 139 to the valve chamber 119.

Associated with the valve device 115 is a safety valve device 140 which may be of the same construction as usually employed in universal valve devices and is for the purpose of venting fluid under pressure from the volume reservoir 9 and relay piston chamber 82 to thereby limit the brake cylinder pressure when the equipment is conditioned for passenger train operation and an over reduction in brake pipe pressure is effected in making a service application of the brakes, the flow of fluid to the safety valve device being by way of chamber 124 and a passage 141 leading from the chamber. This safety valve device is set to vent fluid from said reservoir and piston chamber when the pressure therein has been increased to around sixty-three pounds. By thus limiting the pressure in the reservoir and chamber, the relay valve device 6 will function to correspondingly limit the brake cylinder pressure. It will here be understood that this safety valve device only functions to limit the degree of fluid pressure build-up in the volume reservoir 9 and relay piston chamber 82 in effecting a service application of the brakes with the equipment conditioned for passenger train service and is rendered inoperative by the emergency valve device when an emergency application is initiated.

The take-up cylinder device 11 is associated with the brake cylinder 12 and may be of substantially the same construction and for the same purpose as the corresponding device disclosed in the patent of Clyde C. Farmer, No. 2,004,654, issued June 11, 1935. This device, as will hereinafter more fully appear, is adapted to operate to take up slack in the brake rigging and to move the usual brake shoes into light engagement with the car wheels before the brake cylinder 12 is caused to operate to apply braking force to the brake rigging.

*Control of the change-over valve mechanism*

In the present embodiment of the invention, the operation of the change-over valve mechanism to condition the equipment for either passenger, express or freight train service depends upon the pressure of fluid carried in the signal pipe 2, so that the signal pipe pressure will be different for each class of train service, for instance, in passenger train service it will be charged with fluid at the usual pressure of about forty-five pounds, in express train service to a pressure higher than forty-five pounds, say for instance to ninety pounds and in freight train service will be at atmospheric pressure.

*Operation of the change-over control valve device to condition the change-over valve device for passenger train service*

When a car equipped with a fluid pressure brake equipment embodying the invention is in a passenger train, fluid under pressure supplied to the signal pipe 2 in the usual manner flows through pipe and passage 37 to the control chamber 36 of the change-over valve mechanism and flows from the passage 37 to the control chamber 40 at one side of the flexible diaphragm 35 by way of branch passage 39, a cavity 143 in the control slide valve 45 and passage 41. Fluid under pressure in chamber 40 acts to load the diaphragm 35 and thereby the combined spring seat and stop member 47 against movement in a direction toward the left hand, movement in the opposite direction being prevented by the engagement of the collar 48 of the member with an annular stop lug 145 which may be integral with the bushing 49.

When the pressure of fluid in diaphragm chamber 36 has been increased to around ten pounds, the flexible diaphragm 34 is caused to flex inwardly, i. e., in a direction toward the left hand, thereby shifting the stem 44 and associated control slide valve and spring seat 52 in the same direction, such movement being yieldably opposed by the spring 55 which acts on the left hand end of the stem through the medium of the spring seat. The movement of the diaphragm, stem slide valve and spring seat continues until the spring seat is engaged by the stop 51 when the spring 53, acting through the medium of the members 47 and 51, brings the spring seat, stem, slide valve 45 and diaphragm 34 to a stop in the position in which they are shown in Fig. 2.

It will here be understood that when the spring seat 52 and consequently the stem 44 and slide valve 45 are stopped as just described, these parts will be maintained in the position which they have assumed, by the action of the springs 55 and 53, against the normal signal pipe pressure of forty-five pounds applied to one side of the flexible diaphragm 34.

*Initial charging of the equipment with the change-over control valve mechanism in position to condition the equipment for passenger train service*

With the change-over control valve mechanism positioned as just described and the equalizing and emergency valve devices in their normal release positions as shown in Fig. 2, fluid under pressure supplied to the brake pipe 1 in the usual manner through the medium of a brake valve device (not shown), flows therefrom through pipe and passage 31 to both the equalizing piston chamber 16 and emergency piston chamber 24.

Assuming the change-over valve device to be in position to condition the equipment for passenger train service as shown in Fig. 2 of the drawings, fluid under pressure which is being supplied to the equalizing piston chamber 16 flows through passage 148, past a spring weighted check valve 149 to chamber 150 and from thence flows through passage 151, a cavity 152 in the change-over slide valve 61 and passage and pipe 23 to the auxiliary reservoir 7. From the passage 23 fluid under pressure flows through passage 22 to the equalizing slide valve chamber 21 and from thence flows through a port 153 in the equalizing main slide valve 19, passage 155 and a choked port 156 in the change-over slide valve 61 to the slide valve chamber 62, and from thence flows through passage 63 and passage and pipe 64 to the emergency reservoir 8.

Fluid under pressure flows from the slide valve chamber 62 through a passage 65 to a cavity 158 in the change-over control slide valve 45 and from thence flows through a passage 69 to the piston chamber 68 of the change-over valve device. Fluid under pressure also flows from the cavity 158 through a passage 74 to the chamber 73 which is located at the right hand side of the flexible diaphragm 72 of the brake cylinder build up control valve device, fluid under pressure in the chamber 73 acting on the diaphragm 72 to maintain the valve 71 seated on the seat rib 75. Fluid under pressure in the piston chamber 68 acts on the piston 59 of the change-over valve device to maintain said device in its conditioning position.

Fluid under pressure also flows through a feed groove 159 to the equalizing slide valve chamber 21 and consequently to the auxiliary reservoir and emergency reservoir. The passage 23 has interposed therein a choke 160 and at a point intermediate this choke and the passage 22 leading to the equalizing slide valve chamber 21 is a choked passage 161 through which fluid under pressure flows from the passage 148 to the passage 23 and consequently to the auxiliary reservoir and emergency reservoir. It will here be noted that the flow of fluid to the auxiliary reservoir will be at a fairly rapid rate as controlled by the feed groove 159, choke 160 and restricted passage 161.

Fluid under pressure flows from the auxiliary reservoir passage 23 through passage 90 to the slide valve chamber 89 of the control valve device and from thence flows to the piston chamber 85 of said device by way of a passage 162, a cavity 163 in the slide valve 96 of the pilot valve device, and passage 164.

Fluid under pressure being supplied to the emergency piston chamber 24 flows through a choked passage 165 and passage 29 to the emergency valve chamber 28 and to the quick action chamber 30.

With the several parts of the equipment in their normal release position as shown in Fig. 2, the relay piston chamber 82 is connected to the atmosphere by way of passage 81, pipe 88, passage 79, choke 134, passage 131, chamber 130 of the inshot valve device, passage 129, chamber 119, choke 120, passage 114, passage 113, a cavity 166 in the slide valve 88 of the control valve device and passage 167. The volume reservoir 9 is connected to the atmosphere by way of pipe and passage 132 and passage 131, which latter passage leads to the atmosphere as just described. The take up cylinder device 11 is connected to the atmosphere by way of pipe and passage 98, a branch passage 168, a cavity 169 in the slide valve 88 of the control valve device, a passage 170, a port 171 in the equalizing main slide valve 19, a cavity 172 in the auxiliary slide valve 20, a port 173 in the main slide valve, a restricted passage 174, a cavity 175 in the change-over slide valve 61 and a passage 176.

If the change-over valve device should happen to be in position to condition the equipment for express train service when the equipment is being initially charged in passenger train service, fluid under pressure flows from the equalizing piston chamber 16 through the feed groove 159 to the equalizing slide valve chamber 21 and from thence flows through port 153 in the equalizing main slide valve 19, passage 155, a choked port 177 in the change-over slide valve 61 to the slide valve chamber 62 and from thence flows through passage 65, cavity 158 in the control slide valve 25 and passage 69 to the change-over piston chamber 68. Since the change-over piston chamber 60 is connected to the atmosphere through passage 67, a port 178 in the control slide valve 45, control slide valve chamber 42 and passage 43, fluid under pressure in piston chamber 68 causes the control piston assembly and slide valve 61 to move to the position in which they are shown in Fig. 2, thus conditioning the equipment for passenger train service.

*Service application of the brakes with the equipment conditioned for passenger train operation*

When it is desired to effect a service application of the brakes, a gradual reduction in brake pipe pressure is effected through the medium of a brake valve device, not shown, which reduction causes a corresponding reduction in the pressure of fluid in both the equalizing piston chamber 16 and the emergency piston chamber 24. The reduction in the pressure of fluid in the equalizing piston chamber 16 will be at a faster rate than fluid under pressure can flow thereto from the equalizing slide valve chamber 21 by way of the choked passage 161 and feed groove 159, so that the pressure of fluid in said slide valve chamber causes the equalizing piston 17 to move outwardly in a direction toward the left hand, said piston, through the medium of the piston stem 18, shifting the auxiliary slide valve 20 relative to the main slide valve 19.

The auxiliary slide valve as it is thus shifted, laps the port 153 in the main slide valve, thus closing the communication between the equalizing slide valve chamber 21 and the emergency reservoir 8 and also cuts off communication from the port 171 to the port 173 in the equalizing main slide valve 19, thus cutting off communication from the take-up cylinder device 11 to the atmospheric passage 176. The equalizing piston 17 closes communication from both the feed groove 159 and passage 148 to the piston chamber 16, so as to prevent back flow of fluid under pressure from the auxiliary reservoir and equalizing valve chamber 21 to the piston chamber 16. After the feed groove 159 and passage 148 are thus closed, the continued movement of the piston causes the rear end of the auxiliary slide valve 20 to uncover a service port 180 in the main slide valve 19, following which, a shoulder 181, carried by the rear end portion of the piston stem 18, engages the rear end surface 182 of the main slide valve, so that upon further movement of the piston the main slide valve will be shifted in the same direction to service position in which the piston seats on a gasket 183 interposed between the pipe bracket and the casing of the equalizing valve device.

With the equalizing main slide valve in service position, the port 180 registers with passage 170, so that fluid under pressure flows from the equalizing piston chamber 16 and connected auxiliary reservoir to the take-up cylinder device 11 by way of said port and passage, cavity 169 in the control valve device, branch passage 168, and passage and pipe 98. Fluid under pressure thus supplied to the passage 98 also flows to the slide valve chamber 97 of the pilot valve device.

Fluid under pressure being thus supplied to the take-up cylinder 11 causes the piston and stem thereof to move outwardly and actuate the brake rigging to take up the slack therein and to bring the usual brake shoes, not shown, into contact with the car wheels or nearly so. The brake rigging as it is moved by the take-up cylinder draws the push rod of the brake cylinder 12 forwardly relative to the brake cylinder piston, said push rod being automatically locked in its outer-most position with relation to the piston when the brake cylinder piston is moved outwardly by fluid under pressure supplied by the relay valve device 7 as will hereinafter appear. When the pressure of fluid in the take-up cylinder 11 has been increased sufficiently to cause it to function in this manner, the pressure of fluid in the slide valve chamber 97 of the pilot valve device acting on that portion of the rear face of the piston 91 which is encircled by the seat rib 100, causes the piston and thereby the slide valve 96 to move outwardly against the resistance offered by the spring 94. The face of the piston 91 is provided with an annular rib 184 which, when the piston is moved to the extreme outer position, seals against a gasket 185, so as to prevent leakage of fluid past the periphery of the piston from the valve chamber 97 to the atmosphere. It will be understood that the pilot valve device will remain in its normal position until the pressure of fluid in chamber 97 is increased to about thirty pounds. When this pressure is reached the piston 91 moves outwardly and breaks the seal between the piston gasket 99 and the seat rib 100, whereupon the entire area of the inner face of the piston 91 is subjected to the pressure of fluid in chamber 97, and as a result the piston will move with a snap action to its extreme outer position.

The slide valve 96 of the pilot valve device as it is being moved toward its outer or cut-in position, laps the passage 98, thereby cutting off communication from the auxiliary reservoir to the valve chamber 97, and laps the passage 162, thereby cutting off the communication from the slide valve chamber 89 of the control valve device and connected auxiliary reservoir to the piston chamber 85 of the control valve device. After the passages 98 and 163 are lapped, the cavity 163 in the slide valve 96, which remains in communication with the passage 164, is brought into open relation with the passage 186 which leads to the atmosphere, so that fluid under pressure is now vented from the piston chamber 85 of the control valve device to the atmosphere. Further, as the slide valve moves toward its extreme outer position and just before it reaches this position, it uncovers one end of a passage 187 to the valve chamber 97. The other end of this passage 187 has been previously connected to the valve chamber 21 of the equalizing valve device upon movement of the equalizing main slide valve 19 to service position so that fluid under pressure flows from the equalizing valve chamber and connected auxiliary reservoir to the pilot slide valve chamber 97 and acts to maintain the piston 91 of the pilot valve device and slide valve 96 in their extreme outer position.

With the piston chamber 85 of the control valve device vented to the atmosphere as just described, fluid under pressure in slide valve chamber 89 causes the control piston 84 to move outwardly against the opposing action of the spring 86 into sealing engagement with the gasket 185, the piston in its traverse carrying with it the control slide valve 88. The control slide valve 88 as it is thus being moved laps the passage 168 thus cutting off communication from the passage 170 to this passage and consequently to the take-up cylinder device 11. At substantially the same time as the passage is lapped the cavity 169 in the control slide valve 88 connects passage 170 to passage 113, so that fluid under pressure flows from passage 170 through the cavity 169, passage 113, passage 114, choke 120, valve chamber 119, past the unseated valve 118, passage 129, chamber 130, passage 131 and passage and pipe 132 to the volume reservoir 9. From the passage 131 fluid under pressure flows through choke 134, passage 79 and pipe 80 and passage 81 to the relay piston chamber 82.

Fluid under pressure thus supplied to the relay piston chamber 82 causes the relay piston 83 to move inwardly from the position in which it is shown in Fig. 1. As the piston is thus moved, it causes the usual brake cylinder exhaust valve to close and the brake cylinder supply valve to open. With the supply valve open fluid under pressure flows from the supply reservoir 10 by way of pipe 188, relay valve device and pipe 189 to the brake cylinder 12 causing the brake cylinder to act to apply the brakes.

Fluid under pressure flows from the passage 113 through a passage 112 to the diaphragm chamber 107 of the control valve device 102 and when the pressure of fluid in this chamber has been increased to around thirty pounds the flexible diaphragm 103, being subjected to this pressure together with the pressure of fluid acting on the inner seated area of the valve 108, will be caused to flex outwardly against the opposing pressure of the spring 106, and as a result the valve 108 will be unseated, so that fluid under pressure will flow from the passage 112 through passage 111 and passage and pipe 98 to the take-up cylinder device. This permits the equalization of the relay piston chamber and take-up cylinder pressures. The valve 108 will remain unseated until, as will hereinafter appear, the brakes are being released.

Fluid under pressure supplied to the passage 79 besides flowing to the relay piston chamber, also flows to the piston chamber 124 of the inshot valve device by way of a cavity 190 in the change-over slide valve 61, passage 17, a cavity 191 in the control slide valve 88, a passage 192, a cavity 193 in the emergency main slide valve 27, passage 127, volume reservoir 126 and passage 125. It will here be noted that since the flow of fluid under pressure to the chambers 124 and 130 of the inshot valve mechanism is from the auxiliary reservoir, the pressure of fluid in these chambers will increase together when a service application of the brakes is being effected, so that the spring 123 acts through the medium of the inshot piston 121 and its stem 122 to maintain the valve 118 unseated, thus the inshot valve mechanism is rendered ineffective to vary the rate of flow of fluid under pressure to the relay piston chamber 82.

In passenger train service, the brake equipment is usually charged to a high pressure say to about one-hundred and ten pounds, so that in case of an over reduction in brake pipe pressure in effecting a service application of the brakes, the pressure of fluid in the volume reservoir and relay piston chamber will tend to rise above sixty-three pounds. When such a rise occurs, the safety valve operates to vent fluid under pressure from the piston chamber 124 and consequently from the relay piston chamber 82 and volume reservoir 9, so that the maximum pressure of the volume reservoir and relay piston chambers and consequently of the brake cylinders is limited to sixty-three pounds.

Upon a service reduction in pressure in the emergency piston chamber 24, the emergency piston 25 and associated auxiliary slide valve, not shown, are shifted outwardly, i. e., in the direction toward the right hand, relative to the main slide valve 27, by fluid in the emergency valve chamber 28 at quick action chamber pressure. As the piston is thus shifted, it closes the communication between the emergency piston chamber 24 and the passage 165 connected to the passage 29 leading to the quick action chamber 30 and valve chamber 28, and at substantially the same time, the auxiliary slide valve establishes the usual atmospheric communication through which fluid under pressure is vented from the valve chamber 28 and connected quick action reservoir 30 at a rate substantially equal to the service rate of reduction in the pressure of fluid in the emergency piston chamber 24, so that the operating pressure differential on the emergency piston 25 is substantially destroyed. By reason of this, unintentional further movement of the piston and auxiliary slide valve toward the right hand is prevented.

*Release of the brakes after a service application with the equipment conditioned for passenger train operations*

To effect a release of the brakes after a service application, fluid under pressure is supplied to the brake pipe 1 and flows therefrom to the equalizing piston chamber 16 and emergency piston chamber 24 in the same manner as has hereinbefore been described in connection with the initial charging of the equipment.

To initiate the release of the brakes, it is customary to first move the brake valve to release position, in which fluid under pressure is supplied directly from the main reservoir, not shown, to the brake pipe, and then, after a predetermined interval of time has elapsed, to move the brake valve to running position, in which fluid at feed valve pressure is supplied to the brake pipe.

The initial supply of fluid at high pressure to the brake pipe rapidly increases the brake pipe pressure, the high head of pressure at the front end of the train being adapted to cause a rapid flow of fluid under pressure to the rear of the train, so as to accelerate the release of the brakes and the recharging of the brake equipment on the cars at the rear end of the train.

The rapid increase in brake pipe pressure creates a pressure differential on the piston 17 of the equalizing valve device which causes the piston and thereby the slide valves 19 and 20 to promptly move to their normal release position in which they are shown in Fig. 2. With the piston 17 in this position the feed groove 159 and feed passage 148 are open, so that fluid under pressure is permitted to flow at a restricted rate from the piston chamber 16 through both the feed groove and feed passage to the equalizing slide valve chamber 21 and auxiliary reservoir 7.

With the equalizing main slide valve 19 in release position the cavity 153 therein is in registration with the passage 155, so that fluid under pressure is now supplied at a restricted rate from the fully charged emergency reservoir to the equalizing slide valve chamber 21 and auxiliary reservoir 7 by way of pipe and passage 64, passage 63, change-over slide valve chamber 62, choked port 156 in the change-over slide valve 61, passage 155 and port 153 in the equalizing main slide valve 19, which latter port has been uncovered by the auxiliary slide valve 20. Due to the restricting of the flow of fluid from the brake pipe to the auxiliary reservoir and equalizing valve chambers and to the supplying of fluid from the fully charged emergency reservoir, to the auxiliary reservoir, the amount of fluid taken from the brake pipe will not be great, so that more fluid will flow toward the rear of the train, thus hastening the recharge of the brake pipe on cars at the rear end of the train.

The choke in the port 156 limits the rate at which fluid flows from the emergency reservoir to such an extent that, after the brake valve is moved from release position to running position, and the brake pipe pressure on the cars drops to or below that supplied by the feed valve device at the locomotive, the auxiliary reservoir pressure in valve chamber 21 will be less than the brake pipe pressure in piston chamber 16. By reason of this, unintentional movement of the equalizing valve parts from a release position toward service position in releasing the brakes is prevented.

With the equalizing main and auxiliary slide valves 19 and 20, respectively, in release position, fluid under pressure is vented from the relay piston chamber 82 to the atmosphere by way of passage 81, pipe 80, passage 79, choke 134, passage 131, chamber 130 in the inshot valve device, passage 129, valve chamber 119, choke 120, passages 114 and 113, cavity 169 in the control slide valve 88, passage 170, port 171 in the equalizing main slide valve 19, cavity 172 in the auxiliary slide valve 20, port 173 in the main slide valve, choked passage 174, cavity 175 in the change-over slide valve 61 and passage 176. Since the volume reservoir 9 is in open communication with the passage 131 by way of pipe and passage 132, fluid under pressure is vented from said reservoir through the communication, just traced, which leads from the passage 131 to the atmosphere.

At the same time as fluid under pressure is being vented from the relay piston chamber 82 and volume reservoir 9, fluid under pressure is vented from the take-up cylinder device 11 by way of pipe and passage 98, passage 111, past the unseated valve 108, passage 112, passage 113 and the communication, just traced, which leads from the passage 113 to the atmosphere. Now when the pressure of the take-up cylinder device 11 and relay piston chambers have been reduced, by the venting of fluid therefrom, as just described, to around thirty pounds, the valve 108 will be moved into seating engagement with the seat rib 109 by the action of the spring 106 and will thereby cut off the flow of fluid from the take-up cylinder device 11 by way of passage 112 and communications therefrom to the atmosphere.

With the equalizing main slide valve 19 in release position the passage 187 is in registration with the port 171 so that fluid under pressure is vented from the valve chamber 97 of the pilot valve device with the fluid under pressure being vented from the relay piston chamber 82. Now when the pressure of fluid in the relay piston chamber 82 and consequently in the slide valve chamber 97 of the pilot valve device has been reduced to a low degree, say, for instance, to about five pounds, the spring 94 acts to cause the piston of the pilot valve device to move inwardly to its innermost position in which the gasket 99 seats upon the annular seat rib 100. The piston acting through the medium of the stem 95 shifts the slide valve 96 to its inner position in which, the cavity 163 in the slide valve establishes communication from the passage 162 to the passage 164, so that fluid under pressure is supplied from the control slide valve chamber 89 to the control piston chamber 85. The pressures of fluid acting on the opposite sides of the piston 84 will equalize quickly, so that the spring 86 acts to shift the piston and thereby the control slide valve 88 to their normal release position as shown in Fig. 2 of the drawings.

With the control slide valve 88 in this position, fluid under pressure being vented from the relay valve piston chamber 82 and volume reservoir by way of passage 114, flows through passage 113, cavity 166 in the control slide valve 88, and passage 167 to the atmosphere.

Further, with the slide valve 88 in this position, the cavity 169 in the slide valve establishes communication from the passage 168 leading from the take-up cylinder device 11, to the passage 170, so that fluid under pressure is vented from the take-up cylinder device by way of port 171 in the equalizing main slide valve 19, cavity 172 in the auxiliary slide valve 20, port 173 in the main slide valve, restricted passage 174, cavity 175 in the change-over slide valve 61 and passage 176.

It will here be noted that when the slide valve 96 of the pilot valve device moves to its inner position the passage 98 leading from the take-up cylinder device 11 is connected to the slide valve chamber 97, so that fluid under pressure from the take-up cylinder device equalizes into said chamber, but the equalized pressure acting on the inner seated area of the rear face of the piston is insufficient to cause the piston to move outwardly against the opposing pressure of the spring 94, so that the piston and slide valve will remain in their inner position. Since the passage 98 is connected to the atmosphere the chamber 97 will be vented with the take-up cylinder device.

Fluid under pressure is vented from the piston chamber 124 of the inshot valve device by way of passage 125, volume chamber 126, passage 127, cavity 193 in the emergency main slide valve, passage 192, a cavity 200 in the slide valve 88 of the control valve device, a passage 201, a cavity 202 in the equalizing main slide valve, port 171, cavity 172 in the auxiliary slide valve 20, port 173 in the equalizing main slide valve, passage 174, cavity 175 in the change-over slide valve 61 and passage 176.

Upon the venting of fluid under pressure from the volume reservoir 9 and piston 82 the relay valve device 6 will function to vent fluid under pressure from the brake cylinder 12 in identically the same manner as the corresponding device does in the equipment disclosed in our aforesaid pending application, Serial No. 743,546.

It will here be understood that by delaying the release operation of the take-up cylinder device until after the brake cylinder pressure has been reduced to a low degree and then reducing the brake cylinder pressure at a rate faster than that of the reduction in the take-up cylinder pressure, the automatic unlatching operation of the latch box mechanism carried by the brake cylinder will be insured before such mechanism is subjected to the releasing action of the take-up cylinder device, thus eliminating the possibility of damage to the latch mechanism by the take-up cylinder device.

*Emergency application of the brakes with the equipment conditioned for passenger train operation*

To effect an emergency application of the brakes, fluid under pressure is vented from the brake pipe 1 and from the connected equalizing valve piston chamber 16 and emergency valve piston chamber 24 at a rapid rate, and upon said reduction, the equalizing valve device operates in the same manner as in effecting a service application of the brakes to supply fluid under pressure from the auxiliary reservoir to the passage 170.

With the equalizing valve device in application position, the control valve mechanism 5 functions in the same manner as in effecting a service application of the brakes to first supply fluid under pressure to the take-up cylinder device 11 until the pressure thereof is increased to about thirty pounds, to then supply fluid under pressure to the relay piston chamber 82 and volume reservoir 9 and to finally supply fluid under pressure to both the take-up cylinder device and relay piston chamber and volume reservoir 9.

At substantially the same time as the equalizing valve device operates upon an emergency reduction in brake pipe pressure, fluid under pressure in the emergency piston chamber 28, acting on the inner face of the emergency piston 25, causes the piston to move outwardly into sealing engagement with the gasket 195 which is interposed between the casing of the emergency valve device and the pipe bracket 13. As the piston is being moved to this position, it closes the communication through the restricted passage 165 from the emergency piston chamber 24 to the passage 29 connecting the emergency valve chamber 28 and quick action chamber 30. After the passage 165 has thus been covered by the piston the usual auxiliary slide valve, not shown, but which is being moved by the emergency piston, uncovers a port in the emergency main slide valve 27 and thereby permits fluid under pressure to flow from the valve chamber 28 and quick action reservoir 30 to the quick action vent valve device 15, causing this latter device to function to vent fluid under pressure from the brake pipe in the usual manner. The piston now shifts the main slide valve 27 to application position and as the valve is thus being shifted it first closes the passage 127 leading to the piston chamber 124 of the inshot valve device and safety valve device 140 and then brings the cavity 193 into registration with the emergency reservoir passage 63. Since the cavity 193 remains in communication with the passage 192 fluid under pressure flows from the emergency reservoir to this latter passage. Due to the passage 192 being lapped by the control slide valve 88, fluid under pressure will not flow from this passage until the control valve device is moved to its outer position. When the pressure has been increased to about thirty pounds the control piston 84 shifts the control slide valve 88 to its outer position in which the cavity 191 establishes communication from the passage 192 to the passage 77 so that fluid under pressure from the emergency reservoir flows through this latter passage to the piston chamber 82 of the relay valve device by way of cavity 190 in the change-over slide valve 61, passage 79, pipe 80 and passage 81. It will here be noted that the flow of fluid from the auxiliary reservoir to the relay piston chamber 82 is controlled by the choke 134 and that the flow of fluid from the emergency reservoir is by way of passage 79 which by-passes the choke. It will also be noted that the volume reservoir 9 is connected to the passage 131 at a point intermediate the inshot valve device and the choke 134 so that the reservoir will have little or no effect upon the rate of increase in the pressure of fluid in piston chamber 82 of the relay valve device, thus the relay piston chamber pressure is increased rapidly and as a result effects a prompt application of the brakes.

It will here be understood that since the emergency main slide valve 27 laps the passage 147 before the emergency reservoir passage 63 is in communication with the cavity 193, the inshot piston chamber 124 will be at atmospheric pressure. Now when the pressure of fluid in chamber 131 of the inshot valve device and acting on the inner seated area of the rear face of the inshot piston 121 is sufficient to overpower the spring 125 acting on the opposite face of the piston, the piston will move outwardly so that the spring 123 will seat the valve 118 and thereby cut off the flow of fluid to passage 131 by way of passage 129. With the valve thus seated, fluid under pressure flows from valve chamber 119 to passage 131 by way of the choke 133 and chamber 130 but this retardation of the rate of flow of fluid to the passage 131 will have little or no effect upon the rate of increase in the pressure of the relay piston chamber for, as will be understood from the foregoing description, fluid under pressure flows at a rapid rate to the relay piston chambers independently of the chokes 133 and 134.

It will be understood that with the passage 127 lapped by the emergency main slide valve 27, the safety valve device 140 is rendered inoperative so that the emergency and auxiliary reservoir pressures may equalize into the volume reservoir and relay piston chamber at a higher pressure than would be possible if this were not the case.

*Release of the brakes after an emergency application with the equipment conditioned for passenger train operation*

To effect a release of the brakes after an emergency application, fluid under pressure is supplied to the brake pipe 1 in the usual manner and flows to the equalizing piston chamber 16 and to the emergency piston chamber 24.

Fluid in the equalizing valve chamber 16 is at reduced auxiliary reservoir pressure and fluid in the emergency valve chamber 28 is at atmospheric pressure, so that upon a slight increase in brake pipe pressure, the emergency piston 25 will start to move rearwardly to release position before the equalizing valve device is caused to move to release position.

Now when the brake pipe pressure has been increased about one and one-quarter pounds above the reduced auxiliary reservoir pressure in the equalizing valve chamber 21, the equalizing valve device will be caused to move to release position. With the equalizing valve device in this position the release of fluid under pressure from the relay piston chamber 82, volume reservoir 9 and take-up cylinder device 11 will be accomplished in substantially the same manner as has heretofore been described in connection with the release of the brakes after a service application of the brakes.

*Operation of the equipment with the change-over valve device in position to condition the equipment for express train operation*

Figures 3, 4:
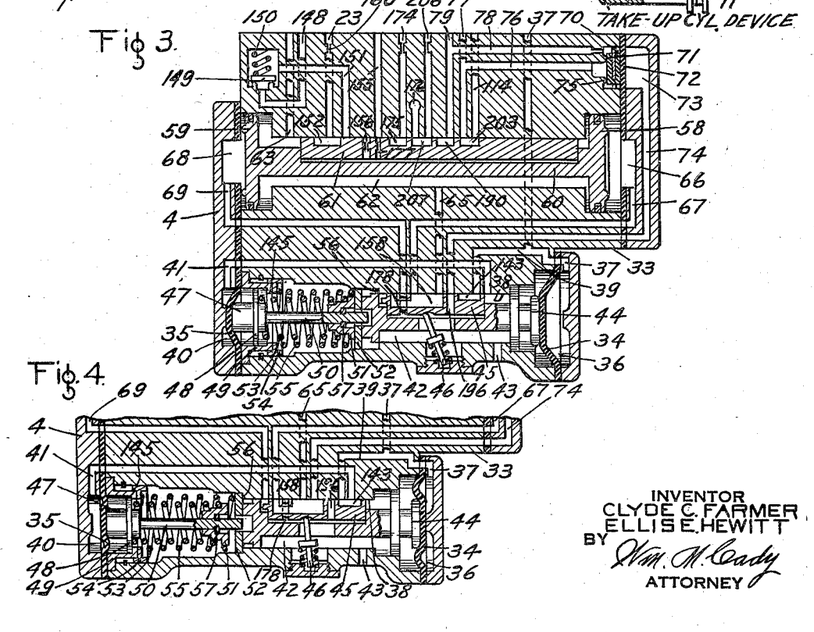
Fig. 3 is a fragmentary sectional view showing the change-over valve mechanism in position for positioning the equipment for express train service and Fig. 4 is a fragmentary sectional view showing a portion of the change-over valve mechanism in the position it assumes to condition the equipment for freight train service.

When a car equipped with a fluid pressure equipment embodying the invention is employed in express train service, the signal pipe pressure, being higher than forty-five pounds, causes the flexible diaphragm 34 of the change-over control valve device to operate to shift the stem 44 and thereby the control slide valve 45 to their innermost position as shown in Fig. 3. As the slide valve is being moved beyond the position it assumes in passenger service, the stem 44, acting through the medium of the spring seat 52, causes the spring seat 51 to move toward the left relative to the member 47, compressing spring 53. As the spring 53 is being thus compressed, the slide valve 45 uncovers passage 41 to the slide valve chamber 42 which is connected to the atmosphere through passage 43, thus venting diaphragm chamber 40 to the atmosphere. With chamber 40 thus vented the spring 53 acts to move the member 47 longitudinally relative to the stem 44 and spring seats 52 and 51 to its extreme left hand position as shown in Fig. 3, in which position, the ring 57 carried by the stem 50 of the member engages the spring seat 51. From this, it will be apparent that the stem 44 is relieved of the pressure of the spring 53. The spring 55 continues to act on the spring seat 52 and stem 44, but is of such a value that it cannot cause these parts and slide valve 45 to shift out of the adjusted position they have assumed until such time as the pressure of fluid in the diaphragm chamber 36 has been reduced to around ten pounds, but such a reduction in signal pipe pressure will not occur unless the car carrying the equipment is set out of a train. From this, it will be understood that when the several parts of the change-over control valve device have been positioned to condition the equipment for express train service, it cannot unintentionally assume its passenger service position even though, due to leakage, the signal pipe pressure may be subsequently reduced to as low as forty-five pounds.

With the control slide valve 45 in its innermost position, the port 176 is in registration with the passage 69, so that the piston chamber 68 of the change-over valve device is vented to the atmosphere. Further, with the slide valve in this position, the cavity 158 connects the passages 65 and 67 together, so that the fluid under pressure from the change-over slide valve chamber 62, which is in communication with the emergency reservoir, flows to the change-over piston chamber 66 and causes the change-over pistons and slide valve 61 to move to their extreme left hand position as shown in Fig. 3. The slide valve 45 is provided with a port 196 which establishes communication from the passage 74 to the slide valve chamber 42 and consequently to the atmosphere, so that the diaphragm chamber 73 is at atmospheric pressure. The change-over valve mechanism is now in position to condition the equipment for express train operation and will remain in this position so long as the signal pipe pressure does not reduce below ten pounds.

With the change-over valve mechanism positioned to condition the equipment for express train operation, the equipment, with but few exceptions, which will hereinafter be enumerated, is substantially the same as when the equipment is conditioned for passenger train operation.

The first difference is that, with the change-over slide valve 61 in this position, the communication between the passages 23 and 151 is cut off, so that fluid under pressure is supplied from the equalizing piston chamber 16 to the equalizing slide valve chamber 21 and auxiliary reservoir by way of the feed groove 159, passage 148, choke 158 and passage and pipe 23, instead of by way of these two communications and the additional communication established by the cavity 152 in the change-over slide valve 61 when said valve is in position to condition the equipment for passenger train operation. By thus cutting off the last mentioned communication the charging rate of the equalizing piston chamber and auxiliary reservoir is slower than that of the rate of charge in passenger train service.

A second difference is that the passage 155 is connected to the change-over slide valve chamber 62 and consequently to the emergency reservoir through a port 177 in the change-over slide valve instead of through the port 156. In releasing the brakes, the flow of fluid under pressure from the brake pipe to the equalizing valve chamber and connected auxiliary reservoir by way of the choke 134 and feed groove 159 and from the emergency reservoir to said chamber by way of the choked passage 177 is so restricted that the increase in the pressure of fluid in the equalizing valve chamber will be at a slower rate than that of the increase in brake pipe pressure in the equalizing piston chamber, so that there will be no tendency for the equalizing valve parts to be unintentionally shifted to lap position when a full release of the brakes is being effected.

Another difference is that in effecting an emergency application of the brakes the passage 77, instead of being connected to the passage 79, is connected to the passage 114 through a cavity 203, so that fluid under pressure supplied from the emergency reservoir to the passage 77 flows to the relay piston chamber 82 by way of passage 76 past the valve 71 which is open by the pressure of fluid in the passage 76, a choke 204 in the passage 78, passage 79, pipe 80 and passage 81. In effecting an emergency application, fluid under pressure is supplied to the volume reservoir 9 and relay piston chamber in the same manner as described in connection with the effecting of a service application of the brakes with the equipment conditioned for passenger train operation. It will be noted that the increase in relay piston chamber pressure consequently in the brake cylinder pressure will be at two different rates, that is to say, there will be an inshot of fluid under pressure as controlled by the chokes 134 and 204 until such time as the relay piston chamber has been increased sufficiently to cause the inshot valve device to operate to seat the inshot valve 118, and then there will be a slow increase in pressure as controlled by the chokes 133 and 204.

A further difference is that the graduated release passage 174 is lapped by the change-over slide valve 61 and a direct release passage 206 is connected through a cavity 207 in the slide valve 61 to the passage 176. By reason of this, graduated release operations are cut out in express train service. The graduated release features of the apparatus are substantially the same as those fully described and claimed in our aforementioned pending application, Serial No. 734,546 and for this reason a detail description of such features is deemed unnecessary in the present application.

*Operation of the equipment with the change-over valve device in position to condition the equipment for freight train operation*

In cars equipped especially for freight train service the signal pipe is omitted, so that when a car equipped with a fluid pressure brake equipment embodying the invention is employed in freight train service, the signal pipe 2 will be opened to the atmosphere through the usual coupling hose at each end of the car, consequently the signal pipe and connected diaphragm chambers 36 of the change-over control valve device will be at atmospheric pressure.

With this chamber 36 at atmospheric pressure, the spring 53 acting through the medium of the spring seat 52 maintains the stem 44 and control slide valve 45 in their extreme outer position, as shown in Fig. 4, in which position the diaphragm 34 may stop against the casing and in which the spring seat 52 stops against the shoulder 56 of the casing.

With the control slide valve 45 thus positioned, the piston chamber 68 of the change-over valve device is connected to the atmosphere by way of passage 69, control slide valve chamber 42, and passage 43. Further, with the control slide valve 45 in this position, the cavity 158 therein connects the passage 65 to the passages 67 and 74.

In charging, fluid under pressure supplied to the equipment flows through passage 65, cavity 158 in the control slide valve 45, and passages 67 and 74 to the piston chamber 56 of the change-over valve device and chamber 73, respectively. Fluid under pressure thus supplied to the chamber 66 causes the change-over piston assembly to operate to shift the change-over slide valve 61 to the position in which it is shown in Fig. 3 if the piston and slide valve are not already in this position. The change-over valve mechanism is now in position to condition the equipment for freight train service.

It will here be noted that the change-over slide valve 61 assumes the same position in both express train service and freight train service, and that with the exception of the control of the rate of build up of pressure in the relay piston chamber 82 in effecting an emergency application of the brakes, is the same as in express train service.

In effecting an emergency application of the brakes in express train service, the valve 71 is unseated so that fluid under pressure from the emergency reservoir is supplied directly to the relay piston chamber 82 by way of choke 204 and passage 78, but in freight train service, fluid under pressure in chamber 73 maintains the valve 71 seated so that fluid under pressure from the emergency reservoir flows to the relay piston chamber 82 by way of passage 77, a cavity in the change-over slide valve 61, passage 114, choke 120, valve chamber 119 of the inshot valve device, past the open inshot valve 118, passage 129, chamber 130, passage 131, choke 134, passage 79, pipe 80, and passage 81.

Now when the pressure of fluid being supplied to the relay piston chamber through chamber 130 in the inshot valve device and passage 131 and acting on the inner seated area of the inshot valve piston 121, becomes great enough to overcome the opposing force of the spring 123, said valve piston moves to its outermost position in which the face of the valve piston seats on a gasket mounted in the casing.

As the inshot valve piston is thus being moved the spring 128 acts to seat the inshot valve 118, thereby closing off the rapid flow of fluid from the auxiliary reservoir and emergency reservoir to the relay piston chamber by way of passage 129, in the inshot valve device. With the valve 118 thus seated, fluid under pressure continues to flow from the inshot valve chamber 119 to the relay piston chamber by way of the choke 133, which choke forms a by-pass communication around the valve 118.

Since the inshot valve chamber 119 is connected through passage 139 to the chamber 138, the pressure of fluid in chamber 119 acts on the inner seated area of the timing valve 116, and that portion of the diaphragm and valve which is exposed to the pressure of fluid in chamber 136 is subjected to the pressure of fluid supplied through the choke 135, so that one side of the flexible diaphragm 117 is subjected to fluid at relay piston chamber pressure and the pressure of fluid in chamber 136. The other side of this diaphragm is subjected to the reducing quick action chamber pressure in the emergency valve chamber 28 and to the pressure of spring 137. When the increasing pressure of the first mentioned side of the flexible diaphragm becomes sufficient to overcome the pressures of fluid and spring acting on the other side, said diaphragm is flexed outwardly, permitting fluid under pressure acting on the inner seated area of the valve to move the valve from its seat.

The pressure of fluid acting on the inner seated area of the valve is greater than the fluid pressure in diaphragm chamber 136 due to the restriction offered to the flow of fluid by choke 135, so that upon breaking the seal between the valve and its seat, the whole surface of the flexing portion of the diaphragm is subjected to the higher pressure from chamber 138, which results in the diaphragm being quickly flexed outwardly, permitting fluid under pressure from chamber 138 to unseat the valve with a snap like action. With the valve unseated, fluid under pressure now flows from the chamber 138 past the unseated valve 116 and through the choke 135, chamber 130 in the inshot valve mechanism, and passage 131 to the volume reservoir 9 and relay piston chamber 82. Since fluid under pressure continues to flow through the choke 133 in the inshot valve device to the brake cylinders this third stage of increase in brake cylinder pressure will be at a fairly fast rate. The relay piston chamber pressure continues to build up to equalization with the pressure in said reservoir.

*Brief summary of the controlled build up of brake cylinder pressure, the control of the take-up cylinder and brake cylinder and the control of the change-over valve mechanism*

From the foregoing description, it will be apparent that the improvements in the fluid pressure brake equipment involves first; the feature of controlling the rate of increase in brake cylinder pressure differently in each class of train service in effecting an emergency application of the brakes; second, the feature of controlling the sequential supply of fluid under pressure to and the sequential release of fluid under pressure from the take-up cylinder and the brake cylinder; and third, the feature of controlling the operation of the change-over valve mechanism in a simple and novel manner.

As to the first feature, it will be noted that in effecting an emergency application of the brakes with the equipment conditioned for passenger train service, fluid under pressure flows from the emergency reservoir by way of the brake cylinder control valve device and change-over valve device directly to the piston chamber 82 of the relay valve device 6, that is to say, independently of the volume reservoir 9 and inshot valve device, thus insuring the prompt and rapid build up of brake cylinder pressure. In express train service the change-over valve device cuts off direct communication from the emergency reservoir to the relay piston chamber 82 and cuts the valve 71 into operation so that there will be a rapid inshot of fluid under pressure to the relay piston chamber by way of the open inshot valve 118 followed by a more gradual build up as controlled by the choke 133 upon the seating of the inshot valve 118 and by the choke 204 upon the unseating of the valve 71. In freight train service the inshot valve device and timing valve 116 function to control the build up of brake cylinder pressure in three stages in substantially the same manner as in the "AB" brake equipment, that is to say, there will be a rapid inshot of fluid to the brake cylinder followed by a gradual increase in brake cylinder pressure as controlled by the choke 133 and finally a rapid build up in brake cylinder pressure due to the opening of the timing valve 116.

As to the second feature, the brake cylinder control valve device functions to first supply fluid under pressure to the take-up cylinder and to then supply fluid under pressure to the brake cylinder in effecting an application of the brakes. In effecting the release of the brakes the valve device 102 cooperates with the brake controlling valve device to hold back the release of fluid under pressure from the take-up cylinder until such time as the brake cylinder pressure has been reduced to some low degree, thus insuring the complete release movement of the brake cylinder piston before the take-up cylinder piston starts to move to release position. By reason of this, the liability of damage to latch mechanism, carried by the brake cylinder piston, by the movement of the piston of the take-up cylinder, is eliminated.

The third feature involves the control and action of the spring 53. This spring is adapted to be rendered effective, by fluid under pressure acting on the flexible diaphragm 35, to stop the change-over control abutment 34 and slide valve 45 in their passenger train position and to yieldably oppose movement of the abutment and slide valve from passenger train position to their express train position. However, as the control slide valve is being moved to express train position, the pressure of fluid acting on the diaphragm is reduced to atmospheric pressure so that the spring 53, which has been partially compressed, is permitted to expand to its maximum length. Due to this expansion the spring is rendered ineffective to exert pressure on the control abutment and slide valve and as a consequence the abutment and slide valve will remain in their express train position until such time as the signal pipe pressure has been reduced to ten pounds or less, thus insuring against unwanted movement of the control valve device from express train position to passenger train position upon unintentional variations in signal pipe pressure.

While one illustrative embodiment of the invention has been described in detail, it is not our intention to limit its scope to that embodiment or otherwise than by the scope of the appended claims.

Having now described our invention, what we claim as new and desire to secure by Letters Patent, is:

1. In a fluid pressure brake equipment adapted to be conditioned to function for different classes of train service, in combination, a change-over valve mechanism for selectively conditioning the equipment for any one of said classes of train service, said mechanism having a plurality of change-over positions and being operative by fluid under pressure within a certain range of pressures to one of the change-over positions, means for loading the mechanism in said position to prevent the mechanism from moving to another of the change-over positions unless the pressure for actuating the mechanism is in excess of the maximum pressure of said range of pressures, said means being normally maintained in its loading position by fluid under pressure, and means operative when the mechanism is being moved to said other position to reduce the pressure of fluid acting on said means to effect the operation of said means to unload the mechanism.

2. In a fluid pressure brake equipment adapted to be conditioned to function for different classes of train service, in combination, a change-over valve mechanism for selectively conditioning the equipment for any one of said classes of train service, said mechanism having a plurality of change-over positions and being operative by fluid under pressure within a certain range of pressures to one of the change-over positions, and means positioned by fluid under pressure for loading said mechanism in said position against movement to another of the change-over positions unless the pressure of fluid for actuating the mechanism is in excess of the maximum pressure of said range of pressures, said means being operable out of loading relationship with the mechanism when the mechanism is being moved to said other position.

3. In a fluid pressure brake equipment adapted to be conditioned to function for different classes of train service, in combination, a change-over valve mechanism for selectively conditioning the equipment for any one of said classes of train service, said mechanism having a plurality of change-over positions and being operative by fluid under pressure within a certain range of pressures to one of the change-over positions, means positioned by fluid under pressure for loading said mechanism in said position against movement to another of the change-over positions unless the pressure of fluid for actuating the mechanism is in excess of the maximum pressure of said range of pressures, said means being movable out of loading relationship with said mechanism upon the release of fluid pressure acting thereon, and means included in said mechanism operative upon movement of the mechanism toward said other position for venting fluid under pressure acting on said means.

4. In a fluid pressure brake equipment adapted to be conditioned to function for different classes of train service, in combination, a change-over valve mechanism for selectively conditioning the equipment for any one of said classes of train service, said mechanism having a plurality of change-over positions and being operative by fluid under pressure within a certain range of pressures to one of the change-over positions and being operative to another of said change-over positions by fluid at a pressure in excess of the maximum pressure of said range of pressures, yieldable resistance means loading said mechanism against movement to said other position unless the pressure of fluid for actuating the mechanism is in excess of the maximum pressure of said range of pressures, means subject to fluid under pressure for maintaining said yieldable resistance means in loading position and operative upon the venting of fluid under pressure acting thereon to permit the loading means to move out of loading relationship with said mechanism, and means included in said mechanism operative when the mechanism is moved toward said other change-over position for venting fluid under pressure from the second mentioned means.

5. In a fluid pressure brake equipment adapted to be conditioned to function for different classes of train service, in combination, a change-over valve mechanism for selectively conditioning the equipment for any one of said classes of train service, said mechanism having a plurality of change-over positions and being operative by fluid under pressure within a certain range of pressures to one of the change-over positions, means positioned by fluid under pressure for loading the mechanism in said change-over position to prevent the mechanism from moving to another of said change-over positions unless the pressure of fluid for actuating the mechanism is in excess of the maximum pressure of said range of pressures, and means operative upon movement of said mechanism from the first mentioned change-over position towards said other change-over position for venting fluid under pressure acting on the loading means, to permit the loading means to move out of loading relationship with said mechanism.

6. In a fluid pressure brake equipment adapted to be conditioned to function for different classes of train service, in combination, a change-over valve mechanism for selectively conditioning the equipment for any one of said classes of train service, said mechanism having a plurality of change-over positions and being operative by fluid under pressure within a certain range of pressures to one of the change-over positions, means positioned by fluid under pressure for loading the mechanism in said change-over position and operative upon the venting of fluid under pressure therefrom for permitting said valve mechanism to move to said other position, and means included in said mechanism for controlling the supply of fluid under pressure to and the release of fluid under pressure from said means.

7. In a fluid pressure brake equipment adapted to be conditioned to function for different classes of train service, in combination, a change-over valve mechanism for selectively conditioning the equipment for any one of said classes of train service, said mechanism having a plurality of change-over positions and being operative by fluid under pressure within a certain range of pressures to one of the change-over positions, means positioned by fluid under pressure for loading the mechanism in said change-over position and operative upon the venting of fluid under pressure therefrom for permitting said valve mechanism to move to said other position, means operative upon movement of said valve mechanism by fluid at a pressure in excess of the maximum pressure of said range of pressures for venting fluid under pressure from the first mentioned means, and means operative upon movement of said valve mechanism upon a reduction in the pressure of fluid acting thereon to a pressure below the minimum pressure of said range of pressures to supply fluid under pressure to said means for positioning said means to load said mechanism.

8. In a fluid pressure brake equipment adapted to be conditioned to function for different classes of train service, in combination, a change-over valve mechanism for selectively conditioning the equipment for any one of said classes of train service, said mechanism having a plurality of change-over positions and being operative by fluid under pressure within a certain range of pressures to one of the change-over positions, means for loading the mechanism in said position to prevent the mechanism from moving to another of the change-over positions when the pressure of fluid for actuating the mechanism does not exceed the maximum pressure of said range of pressures, and for yieldably opposing movement of the mechanism to the said other change-over position when the pressure of fluid for actuating the mechanism exceeds said maximum pressure, means subject to fluid under pressure for maintaining the loading means in position to load said mechanism so long as the pressure of fluid acting on said mechanism does not exceed said maximum pressure, and means included in the valve mechanism operative upon movement of the valve mechanism towards said other change-over position for venting fluid under pressure from said means to render the loading means ineffective to exert pressure on said mechanism.

9. In a fluid pressure brake equipment adapted to be conditioned to function for different classes of train service, in combination, a change-over valve mechanism for selectively conditioning the equipment for any one of said classes of train service, said mechanism having a plurality of change-over positions and being operative by fluid under pressure within a certain range of pressures to one of the change-over positions, means positioned by fluid under pressure for loading the mechanism in said position to prevent the mechanism from moving to another of the change-over positions unless the pressure of fluid for actuating the mechanism is in excess of the maximum pressure of said range of pressures, means included in the mechanism operative to vent fluid under pressure from said means when the mechanism is moved towards said other change-over position to relieve the mechanism of the load imposed thereon by said means, and means operative when the pressure for actuating the mechanism is less than the minimum pressure of said range of pressures for moving the mechanism to a third change-over position.

10. In a fluid pressure brake equipment adapted to be conditioned to function for different classes of train service, in combination, a change-over valve mechanism for selectively conditioning the equipment for any one of said classes of train service, said mechanism having a plurality of change-over positions and being operative by fluid under pressure within a certain range of pressures to one of the change-over positions, a spring for yieldably opposing movement of the mechanism to said change-over position, stop means normally positioned by fluid under pressure to stop the movement of the mechanism in said change-over position when the pressure of fluid for actuating the mechanism is within said range of pressures, said stop means being adapted to yieldably oppose the movement of the mechanism from said change-over position to another change-over position when the pressure of fluid for actuating the mechanism is in excess of the maximum pressure of said range of pressures, and means included in said mechanism operative as the mechanism is moved to said other change-over position to relieve said stop means of the pressure of fluid to permit said stop means to relieve the mechanism of the pressure of said stop means.

11. In a fluid pressure brake equipment adapted to be conditioned to function for different classes of train service, a change-over valve mechanism for selectively conditioning the brake equipment for any one of said classes of service, said mechanism comprising fluid pressure controlled valve means having a change-over position for each class of service and being operative from one change-over position to another upon an increase in fluid under pressure and to a third position upon a further increase in fluid pressure, means positioned by fluid under pressure for loading said valve means in said other position and means operative to vent fluid under pressure from said means upon movement of said valve means from said other change-over position to said third change-over position to vent fluid under pressure acting on the loading means for causing the loading means to function to unload said valve means.

12. In a fluid pressure brake equipment adapted to be conditioned to function for different classes of train service, a change-over valve mechanism for selectively conditioning the brake equipment for any one of said classes of service, said mechanism comprising fluid pressure controlled valve means having a change-over position for each class of service and being operative from one change-over position to another upon an increase in fluid under pressure and to a third position upon a further increase in fluid pressure, means positioned by fluid under pressure for loading said valve means in said other change-over position, means operative to vent fluid under pressure from said means upon movement of said valve means from said other change-over position to said third change-over position for causing the loading means to function to unload said valve means, and means for moving said valve means from the third change-over position to the first mentioned change-over position only when the pressure of the fluid acting on the valve mechanism has been reduced below that required to move it to said other change-over position.

13. In a fluid pressure brake adapted to be changed over to function for different classes of service, in combination, a change-over valve mechanism comprising fluid pressure controlled valve means operative to selectively condition the equipment for any one of said classes of service, yielding resistance means for opposing movement of said valve means from one of said change-over positions to another, a second yielding resistance means for opposing movement of said valve means from said other change-over position to a third change-over position, means subject to fluid under pressure for positioning said second resistance means to oppose movement of the valve means to said third position and operative upon a reduction in the pressure of fluid acting thereon for relieving the valve means of the load imposed thereon by said second resistance means, and means operative upon movement of the valve means toward said third position against the opposition of said second resistance means for reducing the pressure of fluid acting on said means.

14. In a fluid pressure brake equipment, in combination, a brake cylinder, a take-up cylinder, an equalizing valve device operated upon a reduction in brake pipe pressure for supplying fluid under pressure to said take-up cylinder, valve means normally establishing a communication through which fluid under pressure supplied by the equalizing valve device flows to the take-up cylinder and operative upon a predetermined increase in take-up cylinder pressure to cut off said communication and to establish a communication through which fluid supplied by the equalizing valve device flows to effect the supply of fluid under pressure to the brake cylinder to apply the brakes, and means operative upon a predetermined increase in the pressure of fluid supplied by the equalizing valve device to establish communication between the second mentioned communication and the take-up cylinder.

15. In a fluid pressure brake equipment, in combination, a brake cylinder, a take-up cylinder, an equalizing valve device operated upon a reduction in brake pipe pressure for supplying fluid under pressure to said take-up cylinder, valve means normally establishing a communication through which fluid under pressure supplied by the equalizing valve device flows to the take-up cylinder and operative upon a predetermined increase in take-up cylinder pressure to cut off said communication and to establish a communication through which fluid supplied by the equalizing valve device flows to effect the supply of fluid under pressure to the brake cylinder to apply the brakes, and means operative when the pressure of fluid supplied to effect the operation of the brake cylinder becomes substantially equal to the take-up cylinder pressure to supply fluid under pressure to the take-up cylinder.

16. In a fluid pressure brake equipment, in combination, a brake cylinder, a take-up cylinder, an equalizing valve device operated upon a reduction in brake pipe pressure for supplying fluid under pressure to said take-up cylinder, valve means normally establishing a communication through which fluid under pressure supplied by the equalizing valve device flows to the take-up cylinder and operative upon a predetermined increase in take-up cylinder pressure to cut off said communication and to establish a communication through which fluid supplied by the equalizing valve device flows to effect the supply of fluid under pressure to the brake cylinder to apply the brakes, and means subject to the pressures of the take-up cylinder and brake cylinder and operative upon a predetermined increase in pressure of fluid supplied to effect the operation of the brake cylinder to establish a communication between the second mentioned communication and the take-up cylinder.

17. In a fluid pressure brake equipment, in combination, a brake cylinder, a take-up cylinder, an equalizing valve device operated upon a reduction in brake pipe pressure for supplying fluid under pressure to said take-up cylinder, valve means normally establishing a communication through which fluid under pressure supplied by the equalizing valve device flows to the take-up cylinder and operative upon a predetermined increase in take-up cylinder pressure to cut off said communication and to establish a communication through which fluid supplied by the equalizing valve device flows to effect the supply of fluid under pressure to the brake cylinder to apply the brakes, a spring, and means subject to the opposing pressures of said spring and take-up cylinder pressure and the pressure of fluid being supplied to effect the supply of fluid under pressure to the brake cylinder and operative upon a predetermined increased in the latter pressure for establishing communication between 18. In a fluid pressure brake, in combination, a brake pipe, a brake cylinder, a take-up cylinder, an equalizing valve device operated upon a reduction in brake pipe pressure for supplying fluid under pressure to said take-up cylinder, a relay valve device adapted to be operated by fluid under pressure to supply fluid under pressure to the brake cylinder, a valve device normally establishing a communication through which fluid under pressure flows to the take-up cylinder and operative to cut off said communication and to establish another communication through which fluid under pressure supplied by the equalizing valve device flows to the relay valve device means operative upon a predetermined increase in the pressure of fluid supplied to the take-up cylinder for effecting the operation of said valve means, and means operative upon a predetermined increase in the pressure of fluid being supplied to the relay valve device for establishing a communication through which fluid under pressure being supplied to the relay valve device also flows to the take-up cylinder.

19. In a fluid pressure brake, in combination, a brake pipe, a brake cylinder, a take-up cylinder, an equalizing valve device operated upon a reduction in brake pipe pressure for supplying fluid under pressure to said take-up cylinder, a relay valve device adapted to be operated by fluid under pressure to supply fluid under pressure to the brake cylinder, a valve device normally establishing a communication through which fluid under pressure flows to the take-up cylinder and operative to cut off the communication and to establish another communication through which fluid under pressure supplied by the equalizing valve device flows to the relay valve device, means operative upon a predetermined increase in the pressure of the fluid supplied to the take-up cylinder for effecting the operation of said valve means, and means operative when the pressure of fluid being supplied to the relay valve device becomes substantially equal to the take-up cylinder pressure to establish a communication through which fluid being supplied to the relay valve device flows to the take-up cylinder.

20. In a fluid pressure brake, in combination a brake pipe, a brake cylinder, a take-up cylinder, an equalizing valve device operated upon a reduction in brake pipe pressure for supplying fluid under pressure to said take-up cylinder, a relay valve device adapted to be operated by fluid under pressure to supply fluid under pressure to the brake cylinder, a valve device normally establishing communication through which fluid under pressure flows to the take-up cylinder and operative to cut off said communication and to establish another communication through which fluid under pressure supplied by the equalizing valve device flows to the relay valve device, means operative upon a predetermined increase in the pressure of fluid supplied to the take-up cylinder for effecting the operation of said valve means, and means operative when the pressure of fluid supplied to the relay valve device becomes substantially equal to the take-up cylinder pressure to supply fluid under pressure to the take-up cylinder.

21. In a fluid pressure brake, in combination, a brake pipe, a brake cylinder, a take-up cylinder, an equalizing valve device operated upon a reduction in brake pipe pressure for supplying fluid under pressure to said take-up cylinder, a relay valve device adapted to be operated by fluid under pressure to supply fluid under pressure to the brake cylinders, a valve device normally establishing communication through which fluid under pressure flows to the take-up cylinder and operative to cut off said communication and to establish another communication through which fluid under pressure supplied by the equalizing valve device flows to the relay valve device, means operative upon a predetermined increase in the pressure of fluid supplied to the take-up cylinder for effecting the operation of said valve means, and valve means subject to one side to take-up cylinder pressure and the pressure of fluid being supplied to the relay valve device and on the opposite side to a constant pressure and operative upon a predetermined increase in the pressure of fluid being supplied to the relay valve device for supplying fluid under pressure to the take-up cylinder.

22. In a fluid pressure brake, in combination, a brake pipe, a take-up cylinder, an equalizing valve device operated upon a reduction in brake pipe pressure for supplying fluid under pressure to said take-up cylinder, valve means operative upon a predetermined increase in the pressure of fluid in the take-up cylinder for establishing a communication through which an equalizing valve device supplies fluid under pressure to effect an application of the brakes and for cutting off the supply of fluid to the take-up cylinder, and means operative upon a predetermined increase in the pressure of fluid being supplied to effect an application of the brakes to connect the last mentioned communication and take-up cylinder.

23. In a fluid pressure brake, in combination, a brake pipe, a brake cylinder, a take-up cylinder, an equalizing valve device operated upon a reduction in brake pipe pressure for supplying fluid under pressure to said take-up cylinder, a valve device operative upon a predetermined increase in the pressure of fluid supplied to the take-up cylinder for establishing a communication through which fluid under pressure supplied by the equalizing valve device flows to effect the supply of fluid under pressure to the brake cylinder and for cutting off the supply of fluid under pressure to the take-up cylinder, and valve means operative upon a predetermined increase in the pressure of fluid in said communication for establishing communication between said communication and take-up cylinder.

24. In a fluid pressure brake, in combination, a brake pipe, a brake cylinder, a take-up cylinder, an equalizing valve device operated upon a reduction in brake pipe pressure for supplying fluid under pressure to said take-up brake cylinder, a valve device operative upon a predetermined increase in the pressure of fluid supplied to the take-up cylinder for establishing a communication through which said equalizing valve device supplies fluid under pressure to effect the supply of fluid under pressure to the brake cylinder and for cutting off the supply of fluid under pressure from said communication to the take-up cylinder, and valve means operated when the pressure of fluid in said communication becomes substantially equal to take-up cylinder pressure for again supplying fluid under pressure from said communication to the take-up cylinder.

25. In a fluid pressure brake, in combination, a brake pipe, a take-up cylinder, a brake controlling valve device operative upon a reduction in brake pipe pressure for supplying fluid under pressure to the take-up cylinder, valve means operative upon a predetermined increase in take-up cylinder pressure for cutting off the flow of fluid to the take-up cylinder and for establishing a communication through which fluid under pressure is supplied to effect an application of the brakes, a valve operative upon a predetermined increase in the pressure of fluid in said communication for supplying fluid under pressure from said communication to said take-up cylinder, said brake controlling valve device being operative upon an increase in brake pipe pressures for venting fluid under pressure from said take-up cylinder and communication to initiate a release of the brakes, said valve being operative upon a predetermined reduction in the pressures of the take-up cylinder and communication for cutting off the flow of fluid from said take-up cylinder, and said valve means being operative upon a further reduction in the pressure of fluid in said communication for venting fluid under pressure from said communication and take-up cylinder to effect the release of the brakes.

26. In a fluid pressure brake, in combination, a brake pipe, a take-up cylinder, a brake controlling valve device operative upon a reduction in brake pipe pressure for supplying fluid under pressure to the take-up cylinder, valve means operative upon a predetermined increase in take-up cylinder pressure for cutting off the flow of fluid to the take-up cylinder and for establishing a communication through which fluid under pressure is supplied to effect an application of the brakes, a valve operative upon a predetermined increase in the pressure of the fluid in said communication for supplying fluid from said communication to said take-up cylinder, said brake controlling valve device being operative upon an increase in brake pipe pressure for venting fluid under pressure from said take-up cylinder and communication through a communication common to both to initiate a release of the brakes, said valve being operative upon a predetermined reduction in the take-up cylinder and communication for cutting off the flow of fluid from said take-up cylinder, and said valve means being operative upon a further reduction in the pressure of fluid in said communication for establishing a communication through which fluid under pressure is vented from the take-up cylinder and for establishing another communication through which fluid under pressure is vented from said communication at a faster rate than fluid is being vented from the take-up cylinder.

27. In a fluid pressure brake, in combination, a brake pipe, two brake cylinders, brake controlling valve means operative upon a reduction in brake pipe pressure for supplying fluid under pressure to effect the supply of fluid under pressure to said brake cylinders to apply the brakes and operative upon an increase in brake pipe pressure for effecting a release of fluid under pressure from said brake cylinder to release the brakes, said brake controlling valve means comprising a valve device having a restricted exhaust passage and being operative upon an increase in brake pipe pressure in effecting a release of the brakes for effecting the release of fluid under pressure from both of said brake cylinders by way of said restricted exhaust passage, a valve operative upon a predetermined reduction in brake cylinder pressure for cutting off the flow of fluid from one of said brake cylinders, and means operative upon a predetermined reduction in the other of said brake cylinders for establishing communication through which fluid under pressure is vented by way of said restricted passage to effect the release of fluid under pressure from the first mentioned brake cylinder and for establishing a communication of greater flow area than that of the restricted passage through which fluid under pressure is vented from the said other reservoir.

28. In a fluid pressure brake, in combination, a brake pipe, a brake controlling valve device operated upon a sudden reduction in brake pipe pressure for supplying fluid under pressure to effect an emergency application of the brakes, means for regulating the flow of fluid under pressure in one class of train service in effecting an emergency application of the brakes, means for regulating the flow of fluid under pressure in another class of train service in effecting an emergency application of the brakes, and a change-over valve device having a position in which communication is established for supplying fluid under pressure in effecting an emergency application of the brakes independently of said means.

29. In a fluid pressure brake adapted to be conditioned for different classes of train service, in combination, a brake pipe, a brake controlling valve device operated upon a sudden reduction in brake pipe pressure for supplying fluid under pressure to effect an emergency application of the brakes, valve means operative in one class of train service to regulate the flow of fluid under pressure in effecting an emergency application of the brakes, means operative in another class of train service and cooperating with said valve means to regulate the flow of fluid under pressure in effecting an emergency application of the brakes, and a change-over valve device for conditioning the equipment for any one of said classes of service and having a change-over position for rendering said valve means and means ineffective to regulate the flow of fluid in effecting an emergency application of the brakes.

30. In a fluid pressure brake adapted to be conditioned to function for different classes of train service, in combination, a brake pipe, a brake controlling valve device operated upon a sudden reduction in brake pipe pressure for supplying fluid under pressure to effect an emergency application of the brakes, valve means operative in one class of train service to regulate the flow of fluid under pressure in effecting an emergency application of the brakes, means operative in another class of train service and cooperating with said valve means to regulate the flow of fluid under pressure in effecting an emergency application of the brakes, a change-over valve device for conditioning the equipment for any one of said classes of service and having a change-over position for cutting said valve means into action, another position for cutting said valve means and means into action and another position for cutting the valve means and means out of action.

31. In a fluid pressure brake adapted to be conditioned to function for different classes of train service, in combination, a brake pipe, a brake controlling valve device operated upon a sudden reduction in brake pipe pressure for supplying fluid under pressure to effect an emergency application of the brakes, flow control means operative in one class of train service to regulate the flow of fluid under pressure in effecting an emergency application of the brakes, flow control means operative in another class of train service adapted to cooperate with said valve means to regulate the flow of fluid under pressure in effecting an emergency application of the brakes, and a change-over valve device for conditioning the equipment for any one of said classes of service and having a change-over position for rendering both of said flow control means ineffective to regulate the flow of fluid in effecting an emergency application of the brakes.

32. In a fluid pressure brake, in combination, a brake pipe, a brake controlling valve device operated upon a sudden reduction in brake pipe pressure for supplying fluid under pressure to effect an emergency application of the brakes, valve means operative in one class of service for varying the rate of flow of fluid in effecting an emergency application of the brakes and operative differently in another class of train service to vary the rate of flow of fluid in effecting an emergency application of the brakes, and operative in a third class of train service to provide a constant rate of flow of fluid in effecting an emergency application of the brakes, and a change-over valve device operative to control the action of said valve means.

33. In a fluid pressure brake, in combination, a brake pipe, a brake controlling valve device operated upon a sudden reduction in brake pipe pressure for supplying fluid under pressure to effect an emergency application of the brakes, valve means operative in one class of train service for controlling the rate of flow of fluid in effecting an emergency application of the brakes and operative differently in another class of train service to control the rate of flow of fluid in effecting an emergency application of the brakes and being inoperative to control the rate of flow of fluid in effecting an emergency application of the brakes, and a change-over valve device operative to different positions for controlling the operation of said valve means.

34. In a fluid pressure brake, in combination, a brake pipe, a communication through which fluid under pressure is adapted to be supplied to effect either a service or an emergency application of the brakes, a passage through which fluid under pressure is adapted to be supplied to said communication, a choke in said passage, another passage through which fluid under pressure is adapted to be supplied to said communication independently of said choke, and a brake controlling valve device operated upon a service reduction in brake pipe pressure for supplying fluid under pressure to the first mentioned passage and operated upon an emergency reduction in brake pipe pressure for supplying fluid under pressure to both of said passages.

35. In a fluid pressure brake, in combination, a brake pipe, a communication through which fluid under pressure is adapted to be supplied to effect either a service or an emergency application of the brakes, a passage through which fluid under pressure is adapted to be supplied to said communication, a volume chamber in open communication with said passage, a choke interposed in said passage intermediate said communication and volume chamber, a passage through which fluid under pressure is adapted to be supplied to said communication independently of said choke and volume reservoir, and a brake controlling valve device operated upon a service reduction in brake pipe pressure for supplying fluid under pressure to the choked passage and operated upon an emergency reduction in brake pipe pressure for supplying fluid under pressure to both of said passages.

36. In a fluid pressure brake, in combination, a brake pipe, a communication through which fluid under pressure is adapted to be supplied to effect either a service or an emergency application of the brakes, a passage through which fluid under pressure is adapted to be supplied to said communication, a volume reservoir in open communication with said passage, a choke interposed in said passage intermediate said reservoir and communication, a passage by-passing said choke and through which fluid under pressure is adapted to be supplied to said communication, and a brake controlling valve device operated upon a service reduction in brake pipe pressure for supplying fluid under pressure to the choked passage and operated upon an emergency reduction in brake pipe pressure for supplying fluid under pressure to both of said passages.

37. In a fluid pressure brake, in combination, a brake pipe, a brake controlling valve device operated upon a service reduction in brake pipe pressure for supplying fluid under pressure through one passage having a choke for restricting the rate of flow of fluid through said passage, to a communicating passageway to effect a service application of the brakes, said brake controlling valve device being operated upon an emergency reduction in brake pipe pressure to supply fluid under pressure to said passage and also to another passage through which fluid is supplied to said passageway independently of said choke.

38. In a fluid pressure brake, in combination, a brake pipe, a volume chamber, a brake controlling valve device operated upon a service reduction in brake pipe pressure for supplying fluid under pressure through a passage open to said chamber and having a choke for restricting the rate of flow of fluid through said passage, to a passageway communicating with said passage to effect a service application of the brakes, said brake controlling valve device being operated upon an emergency reduction in brake pipe pressure to supply fluid under pressure to said passage and also to another passage through which fluid is supplied to said passageway independently of said choke and said chamber.

CLYDE C. FARMER.
ELLIS E. HEWITT.